Jan. 23, 1934.  F. W. DOYLE  1,944,683
ASSEMBLING MACHINE
Filed Dec. 26, 1931   3 Sheets-Sheet 1
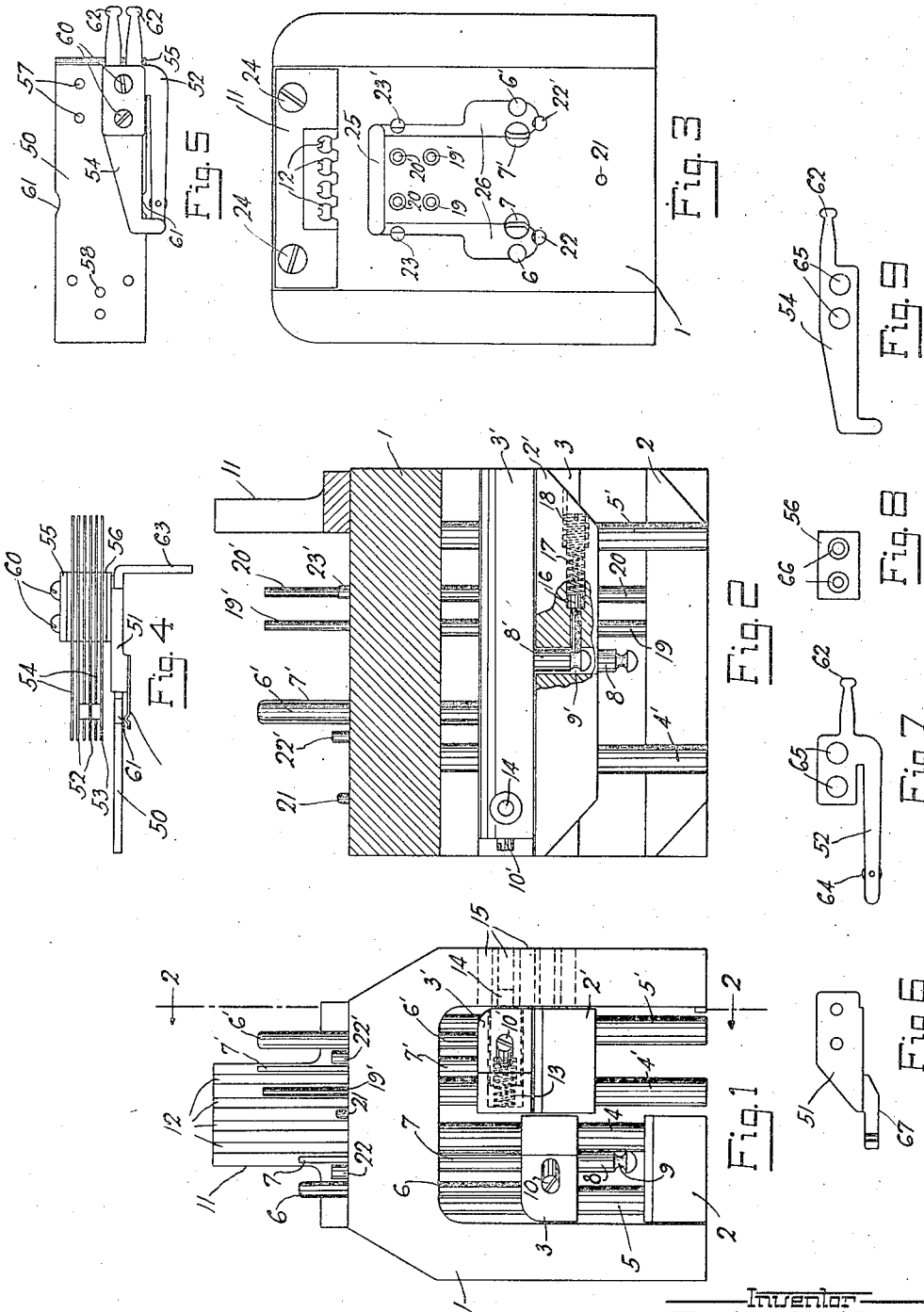
Inventor
Frederick W. Doyle
C. R. Sipe
Atty.

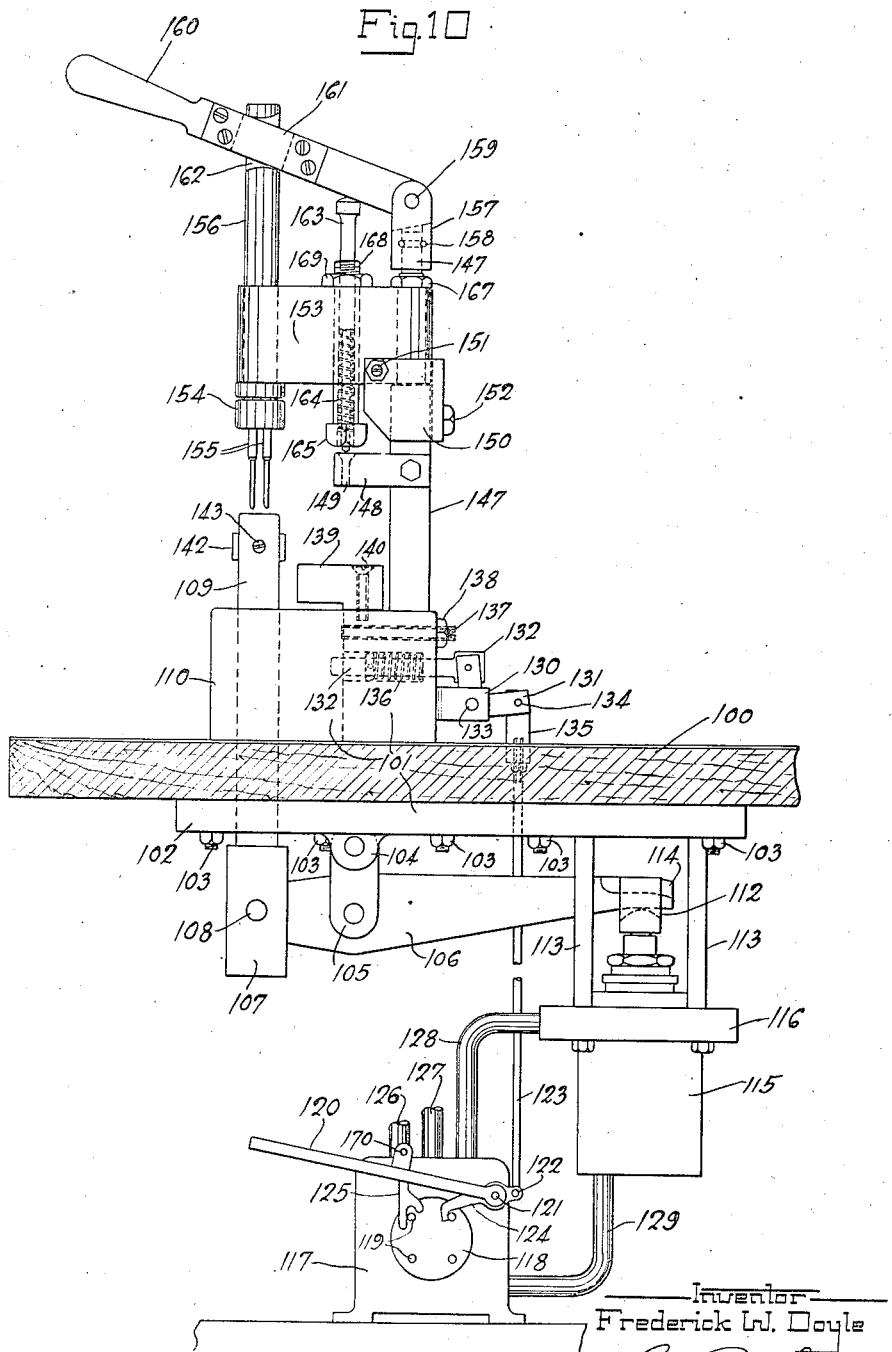

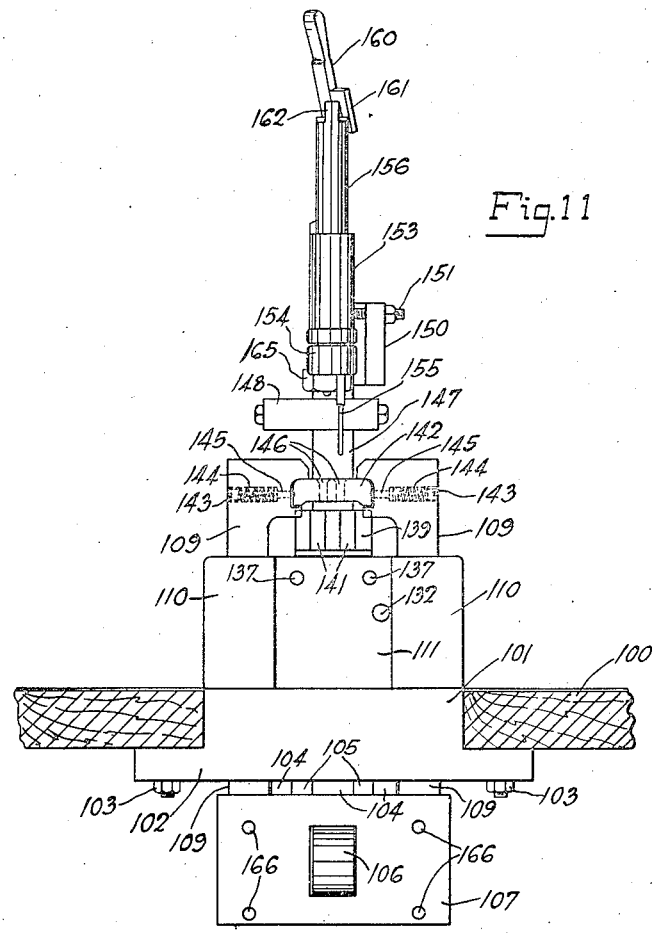

Patented Jan. 23, 1934

1,944,683

UNITED STATES PATENT OFFICE 1,944,683

ASSEMBLING MACHINE

Frederick W. Doyle, Chicago, Ill., assignor, by mesne assignments, to Associated Electric Laboratories, Inc., Chicago, Ill., a corporation of Delaware Application December 26, 1931
Serial No. 583,220

13 Claims. (Cl. 29—84)

The present invention relates to assembling machines and fixtures in general, but more particularly to machines and fixtures for assembling articles consisting of a large number of separate parts held together by suitable retaining means.

The main object of the invention is the production of a machine and an assembling fixture or jig which are especially suitable for assembling the various contact springs and insulators of relays. The particular embodiment disclosed has been designed for assembling the springs and insulators on the heel pieces of horizontal type relays, such as are in general use in automatic telephone systems.

The construction of the machine and assembling fixture is shown in the accompanying drawings, comprising Figs. 1 to 11, inclusive. Fig. 1 is an end view of the assembling fixture upon which the springs and insulators of the relay spring combination are assembled. Fig. 2 is a side view of the assembling fixture along the section line 2—2 of Fig. 1. Fig. 3 is a top view of the fixture. Fig. 4 is a side view of one example of a heel piece and spring combination. Fig. 5 is a top plan view of the combination shown in Fig. 4. Figs. 6 to 9, inclusive, are illustrations of the various springs, insulators, and armature stop which together with the heel piece make up the complete assembly shown in Figs. 4 and 5. Fig. 10 is a side view of a compressor which is used to compress the parts on the assembling fixture after they have been assembled thereon and to hold the parts while retaining means are being applied. Fig. 11 is a front view of the machine shown in Fig. 10.

Referring first to Figs. 1, 2, and 3 of the drawings, the assembling fixture comprises a U-shaped steel base piece 1 having four guide posts 4, 5, 4', and 5' rigidly secured to the upper portion of the base piece 1 and extending parallel to the two side pieces thereof. The members 2 and 3 are slidably mounted on the posts 4 and 5, while the members 2' and 3' are slidably mounted on the posts 4' and 5'. Attached to the member 3 are the guide pins or posts 6 and 7 which extend upward through holes in the upper portion of the base piece 1. Similarly, the pins or posts 6' and 7' are rigidly secured in the member 3' and extend upward through holes in the upper portion of the base piece 1. The positions of the members 3 and 3' may be adjusted by means of the knobs 10 and 10', which are rigidly attached to pins such as 14. The pin 14 is forced into one of a number of holes 15 in the side wall of the base piece 1 by means of the spring 13. Thus the height of the pins 6' and 7', i. e., the distance which these pins extend above the upper face of the base piece 1 may be adjusted by engaging the pin 14 with any one of the holes 15. A similar arrangement is provided in the member 3, and the distance which the pins 6 and 7 project through the upper face of the base piece 1 may be adjusted by means of the adjusting screw 10 and its corresponding pin which engages holes in the left side wall of the base piece 1.

The members 3 and 3' have short pins or posts 8 and 8' extending downward and adapted to engage holes in the members 2 and 2', respectively. As shown in Fig. 2 of the drawings, when the member 2' is raised so that it fits up against the member 3', the pin 8' passes into the hole in the member 2' and the pin 16 engages the groove 9' in the lower end of the post 8'. The pin 16 is held by means of the spring 17, the tension of which may be adjusted by the set screw 18. Thus when the member 2' is raised, it is held in its raised position by means of the pin 16 engaging the groove 9'. Similar arrangements are provided in the member 2 for holding it in its raised position against the member 3.

Rigidly secured to the members 2 and 2' are locating pins 19 and 20 and 19' and 20', respectively. These pins pass through holes in the members 3 and 3' and in the upper portion of the base piece 1, and serve as locating pins over which the various separate parts of the article may be assembled. Thus, as shown in Fig. 2 of the drawings, the member 2' is in its raised position against the member 3' and the pins 19' and 20' extend above the upper face of the block 1 so that the parts of the article may be assembled over these pins.

The short pins 21, 22 and 22', and 23 and 23' are secured in the upper face of the base piece 1 and serve as guide pins for positioning the heel piece and various other parts of the spring assembly as will be explained later. A block 11 is mounted on the upper face of the base piece 1 at one end thereof and is secured to the piece 1 by means of screws 24. This block extends upward at right angles to the face of base piece 1 and has four vertical slots 12 in which the terminals of the contact springs are positioned. Referring to Fig. 3, the upper face of the base piece 1 is recessed at 25 and 26 to allow the parts of the assembly to be positioned thereon.

One example of a heel piece and relay combination such as may be assembled by means of the assembling fixture shown in Figs. 1 to 3 of the drawings is shown in Figs. 4 and 5. This assembly consists of an L-shaped heel piece 50 upon which the contact springs are mounted. The heel piece has two sets of two holes, such as 57, for receiving the retaining screws of the completed assembly. The assembly includes an armature stop 51 which is used as a back stop for the armature of the relay when the relay is completely assembled. This armature stop is shown in detail in Fig. 6 of the drawings. The assembly also includes two shapes of contact springs shown in Figs. 7 and 9 of the drawings. The spring 52 is an operating or armature spring and has a bushing 64 near the end of its flexing arm by means of which it is operated by the preceding movable or armature spring. The spring 54 shown in Fig. 9 of the drawings is a make contact or stationary spring. Spring 53, shown in Fig. 4, is similar to spring 52 but is not equipped with a bushing. This spring is operated directly by the armature of the relay. Each of these springs have two holes such as 65 through which the mounting screws pass. All of the springs of the combination are separated by suitable insulators which are shown in Fig. 8 of the drawings. These insulators consist of a rectangular piece of insulating material having two holes of the size of the mounting screws. The material around each of these holes is slightly raised on one side to form a rim or bushing as high as the thickness of the contact springs. The holes 65 of the contact springs are large enough to pass around the outside of these rims or bushings 66, thereby insulating the contact springs from the mounting screws and from the heel piece of the relay. The assembly is completed by means of a plate 55 which is of the same shape as the insulator 66 but is made of metal. The mounting screws 60 pass through this plate and through the holes in the bushings and springs and are threaded into the holes, such as 57, in the heel piece 50.

The assembling fixture is arranged so that the spring combinations for either right- or left-hand relays may be assembled thereon. The assembly shown in Figs. 4 and 5 is a heel piece and spring combination for a left-hand relay, i. e., the relay occupies a position in the left row of relays on a Strowger switch base. It will be seen that the assembling fixture is symmetrical, i. e., the left and right halves, when looking at Figs. 1 or 3, are identical with each other.

Assuming that the spring combination for a left-hand relay such as shown in Figs. 4 and 5 is to be assembled, the member 3' is adjusted so that the pins 6' and 7' extend the proper distance above the upper face of base piece 1, depending upon the number of springs in the combination to be assembled. The member 2' is then raised into position so that the pin 16 engages the groove 9' in the pin 8'. This raises the locating pins 19' and 20' so that the parts of the assembly may be positioned over these pins. The members 2 and 3 may be lowered so that the pins attached to these members do not extend above the upper face of the base 1 and thereby interfere with the operator in assembling the parts on the fixture. The heel piece 50 is first positioned on the fixture. The base 63 of the L-shaped heel piece extends into the recess 25 in the upper face of the base piece 1. The pin 21 engages with hole 58 of the heel piece and pins 19' and 20' pass through the holes, such as 57. It will be seen from Fig. 3 of the drawings that the pins, such as 7 and 7', are cut away on two sides at the uper ends thereof. Thus when the heel piece is positioned on the fixture, the pin 7' fits into the depression 61 on the right-hand edge of the heel piece 50.

The armature stop 51 is next positioned on the fixture. The pins 19' and 20' are passed through the holes in the armature stop and the end 67 of the stop fits into the recess 26 provided therefor. The end of the armature stop butts up against the locating pin 22' and the side of the armature stop fits up against the locating pin 23'.

The various springs and insulators are now positioned on the fixture with the holes in these parts fitting over the two locating pins 19' and 20'. The springs such as 54 shown in Fig. 9 of the drawings are in contact with the left face of the pin 7' and the terminals, such as 62, are positioned into the groove 12 which is second from the right. The springs, such as 52 shown in Fig. 7 of the drawings, have their flexing arms positioned between pins 6' and 7', and the terminals, such as 62, are positioned in the right-hand groove 12. The first spring, such as 52, rests on top of the pin 22'. The bushings on the operating springs, such as 52, fit into the slightly recessed right-hand face of the pin 7'. The various springs and insulators are assembled on the fixture in this manner and the pile-up is completed by means of the holding plate 55. The assembling fixture, with its pile-up of parts positioned over the various locating pins, is then passed to the compressor shown in Figs. 10 and 11 of the drawings.

The compressor shown in Figs. 10 and 11 of the drawings comprises essentially a main frame 101 having a lower plate 102 which may be bolted to a table or work-bench such as indicated at 100. The upper portion of the frame extending through the bench comprises a rectangular block having a recess 111, formed by a rear wall and the two side walls 110, into which the assembling fixture shown in Figs. 1 to 3 is positioned. Extending through the rear wall of the block or U-shaped frame are two stop screws 137 which stop the fixture in the correct position when it is inserted into the compressor. The distance which the screws project into the recess 111 may be adjusted by means of the tightening nuts 138. Bracket 130 extends from the rear portion of the frame and a link or angle-arm 131 is secured to this bracket and pivoted at point 133. To the upper arm of this link is pivoted a pin, 132, which extends through the frame and into the recess 111. This pin is held in the position shown by means of the spring 136. To the other arm of the link is pivoted a piece 135 into which the rod 123 is threaded and secured by means of the nut. This rod 123 extends through the work table and through the lower plate 102 of the frame to the air valve, as will be explained later.

The air cylinder 115 is secured to the frame of plate 102 by the supporting rods 113. The operating rod extending from the piston terminates in a block 112. This block has an opening formed by L-shaped side pieces so that the T-shaped end of the operating arm 106 will pass through the opening in the block. The end of the operating arm 106 has a portion cut away from each of its upper edges to form a T-shaped cross-section which fits into the opening in the block 112. This allows the piston to operate the operating arm 106 either up or down. The arm 106 is supported from the main frame 101 by the links 105 which are attached to eyelets 104 forming a part of the lower plate 102. The other end of the arm 106 passes through the block 107 and is pivotally secured therein by means of the pin 108. Rigidly secured in the block 107 by pins 166 are the two operating arms 109 which extend through the side walls 110 of the main frame and terminate at the upper ends in two jaws suitable for holding the compressor plate 142. This compressor plate comprises a rectangular block having two sets of holes therein, these holes being located directly above the locating pins 19, 20, and 19′ and 20′ when an assembling fixture is in position in the compressor. Various types of compressor plates may be inserted in the jaws of the compressor by sliding the plate out sideways and substituting another therefor. This is possible since the plate is retained in the jaws by means of pins 145, which engage depressions in the side of the plate. The pins 145 are held in engagement with the depressions by means of springs 144, the tension of the springs being adjusted by means of the set screws 143. Thus the proper compressor plate may be inserted in the machine depending upon the type of relay spring combination which is to be assembled.

Extending vertically upward from the main frame block 101 is the rod or post 147. This rod is securely fastened in the frame 101. Mounted on this rod at its upper end is the handle 160 which is pivoted at point 159. The piece 157 fits over the end of rod 147 and is secured thereto to prevent vertical motion of the piece 157 by means of two pins 158 which extend through the cap 157. These pins engage a groove in the upper end of the rod 147, thereby allowing rotation of the cap 157 on the rod.

Loosely mounted on the rod 147 is a block 153, held in position by a shoulder on the rod 147 at its lower end and by the nut 167 at its upper end. The plunger 156 passes through a hole in the other end of the plate or block 153, the plate 153 serving as a guide for the plunger. The plunger has portions cut away on each side near its upper end forming a narrow shank portion 162 which is held loosely between the lever arm 160 and the clamping plate 161 which is clamped thereto. Portions of the lever arm 160 and the plate 161 are cut away to form an opening for the narrow portion 162 of the plunger. At its lower end, the plunger 156 terminates in a chuck 154 which is arranged to hold the two pins 155.

Also extending through the block or plate 153 is the hollowed cylinder 168 held in position by means of the nut 169. The pin 163 extends through this cylinder and the rounded head at its upper end is in contact with the lever arm 160. This pin is held in its raised position by means of the spring 164 which is retained within the cylinder by means of the nut 165 which is threaded on the cylinder 168. From the foregoing it is seen that the lever arm 160 may be swung to one side and that the plate 153, plunger 156, and guide pin 163 move with the lever arm. An L-shaped plate 150 is secured to the rod 147 by means of bolts 152. A stop screw 151 is threaded through this plate in a position so that the plate 153 strikes against the stop screw when the lever 160 is rotated into the position shown in the drawings. This stop screw 151 may be adjusted so that it will stop the plate 153 with the pins 155 approximately above the holes 146 in the compressor plate 142. In order to exactly align the pins 155 above the holes in the compressor plate, a plate 148 is also secured to the rod 147, and this plate contains a hole 149, counter-sunk at its upper end, so that it will receive the lower end of pin 163. Thus when the lower end of pin 163 passes into the hole 149, the aligning pins 155 will be directly above the holes 146 in the compressor plate.

The compressor is controlled by means of the air valve 117 shown in the lower portion of the drawings. An air line 128 connects this valve to the upper end of the air cylinder 115, and air line 129 connects the air valve to the lower end of this cylinder. The lines 126 and 127 are air-supply and -exhaust lines, respectively. The air valve consists of a rotatable cylinder 118 having a number of pins 119 which are adapted to be engaged by the arm 125 pivoted at point 170 on an extension of the operating lever 120. This lever is pivoted at point 121, as is also the stop pawl or ratchet 124. When there is no assembling fixture in the compressor, the rod 123 is in its raised position due to the spring 136 forcing the pin 132 into recess 111, and the hook-end of arm 124 engages one of the pins 119 so that the cylinder 118 cannot be rotated. When an assembling fixture is inserted in the compressor, the fixture operates the pin 132 to the right against the spring tension, thereby forcing the rod 123 downward and raising the hooked end of arm 124 out of engagement with the pin 119. The operator may then operate the lever 120 by stepping upon it with his foot, whereby the arm 125 engages one of the pins 119 and rotates the cylinder 118 a quarter of a turn. This connects the supply line 129 extending to the lower end of the cylinder to the air-supply line 126 and connects the line 128 extending to the upper end of the cylinder to the exhaust line 127. The piston in cylinder 115 is thereby forced upward, rotating the arm 106 and lowering the block 107. This pulls down the arms 109 and the compressor plate 142. When the lever 120 is again operated, the cylinder 118 is rotated another quarter turn, thereby connecting the air line 128 to the air-supply line 126 and the air line 129 to the exhaust line 127 and forcing the piston to the lower end of the cylinder, thereby raising the arms 109 and the compressor plate 142.

The manner of completing the assembly will now be briefly explained. When an assembling fixture, such as shown in Figs. 1 to 3 of the drawings, has the various parts assembled thereon and is passed to the compressor, it is inserted in the recess 111 formed by the side walls 110. The ends of the relay springs fit into the groove 141 in the end of plate 139 which is held to the main frame of the compressor 101 by means of screws 140. The fixture operates the pin 132, thereby unlocking the air valve so that it may be operated. The stop screws 137 allow the assembling fixture to be inserted only the proper distance so that the pile-up of parts is directly below the compressor plate 142. The ends of the contact springs fitting into the groove 141 in block 139 serve to further align the various parts of the pile-up. When the fixture has been inserted in this manner, the lever arm 160, which is usually rotated a quarter turn to the left so that it will not interfere with the operator when not in use, is now rotated to the right until the plate 153 is stopped by the stop screw 151.

The lever arm 160 is then pulled down, the lower end of pin 163 passing into the hole 149 in the plate 148. This exactly aligns the pins 155 above the holes 146 in the compressor plate. As the lever is lowered, the pins 155 pass through the holes 146 in the compressor plate and strike the ends of pins 19′ and 20′ over which the parts of the article have been assembled. As the lever arm 160 is forced down, the pins 155 force the pins 19' and 20' and the member 2' to which they are attached downward, thereby disengaging the pin 16 from the groove in the post 8'. The member 2' then drops to the bottom of the assembling fixture, thereby removing pins 19' and 20' from the holes in the various parts of the assembly. The aligning pins 155 pass through the holes in the various springs, insulators, and the heel piece, and, since the pins 155 are of a size only slightly smaller than the holes in the insulators, the parts are now exactly lined up one above the other. While the lever arm 160 is in its lowered position and the pins 155 are holding the various parts of the assembly in alignment, the operator steps on the operating arm 120 of the air valve, thereby rotating the cylinder 118 a quarter of a turn and connecting the air line 129 to the air-supply source. The piston cylinder 115 is forced upward, operating the arm 106 and lowering the block 107. This pulls down the arms 109 and the jaws holding the compressor plate 142. The plate 142 engages the plate 55 on top of the assembly and tightly compresses the various parts of the assembly onto the heel piece 50. While the parts are under compression, the lever arm 60 is raised, thereby removing the pins 155 from the holes in the compressor plate and in the parts of the assembly. The arm 160 is then rotated to the left so that it will not interfere with the operator of the compressor. With the parts still under compression, the retaining screws 60 are dropped through the holes 146 in the compressor plate, which are large enough to pass the heads of the screws, and the screws are then tightly inserted into the heel piece 50 by a screw driver, preferably an electric screw driver to speed up the operation. Thus it is seen that the retaining screws 60 are inserted and tightened while the parts of the assembly are under compression and in perfect alignment.

When the screws have been tightened, the operating arm 120 of the air valve is again operated, thereby rotating the cylinder 118 another quarter turn and connecting the air-supply source to air line 128 and the air line 129 to the exhaust line 127. The piston is then forced to the bottom of the cylinder, operating the arm 106 and raising block 107 to raise the compressor plate 142. The assembling fixture is then removed from the compressor and the completed assembly is taken off the fixture.

In practice, a number of assembling fixtures are used with each compressor, and a number of operators are employed to progressively assemble the various parts on these fixtures. The fixtures are then passed in turn to the compressor. The operator of the compressor receives the fixture from the last assembler in line with the completed assembly thereon and places the fixture in the compressor, operating the lever 160 to properly align the parts, compresses the parts, removes the aligning pins, and inserts the retaining screws and tightens them. He then removes the fixture from the compressor and removes the completed assembly therefrom. The empty fixtures are then returned to the beginning of the line of assembling operators. By this method, the assembling operators, and also the compressor operator, can be kept busy continually, the great speed in the assembling of the spring combinations is obtained.

What is claimed is:

1. An assembly fixture for assembling contact springs on L-shaped relay heel pieces, comprising a base piece having a recess therein for receiving the leg of an L-shaped heel piece when the same is positioned on the fixture, a positioning pin on said base piece which engages a hole in the heel piece, and two guide pins on said base piece which fit into depressions along the edge of the heel piece, one on each side thereof.

2. An assembly fixture upon which a plurality of parts may be assembled comprising an upper plate and two supporting legs or side walls, a plurality of guide posts extending downward from the upper plate parallel to said legs, a block slidably mounted on said posts, and a plurality of pins secured to said block and extending upward through holes in said upper plate to serve as locating pins over which the parts may be assembled.

3. An assembly fixture comprising an upper plate and two supporting legs or side walls, a block movably mounted within the recess formed by said side walls, a plurality of pins secured to said block and extending upward through holes in said upper plate to serve as locating pins over which a plurality of parts may be assembled, and means for adjusting the position of said block so that the height of said pins above the face of said upper plate may be regulated according to the number of parts being assembled on the fixture.

4. An assembly fixture for assembling relay spring combinations made up of two types of springs, some having their flexing arms extending along the center line of the holes through which the retaining screws are passed and others having their flexing arms offset from such center line, said fixture comprising a base piece having locating pins which engage the holes in the springs and a positioning pin located so that the flexing arms of springs of the first type are positioned against one side of said pin and the flexing arms of springs of the second type are positioned against the other side of said pin.

5. An assembly fixture having a flat face or surface on which the parts of an assembly may be positioned, a plurality of guide pins projecting upward above said face for assisting in the proper positioning of the parts, means for adjusting the height of said pins, a plurality of locating pins projecting upward above said face over which the parts are assembled, the height of said locating pins being limited by the height of said guide pins, and means for retracting said locating pins from the assembly of parts to permit retaining means to be substituted therefor.

6. An assembly fixture for assembling contact springs on relay heel pieces comprising a block on which the parts are positioned, a plurality of positioning pins extending through the upper face of said block for assisting in the proper positioning of the parts thereon, a plurality of depressible locating pins extending through said face over which the parts are assembled, the pins passing through holes in the heel piece and contact springs, and a block mounted on said face having a plurality of vertical channels into which the terminal ends of the contact springs are positioned to further assist in the proper alignment of said parts.

7. An assembly fixture having an inverted U-shaped frame upon which the parts of an assembly may be positioned, a plurality of guide posts extending downward from the upper portion of said frame and parallel to the side walls thereof, a block slidably mounted on said posts and having pins extending upward through holes in said upper portion to serve as guides for properly positioning said parts, and a second block slidably mounted on said posts and having pins extending through holes in said first block and in said upper portion, said last pins serving as locating pins over which the parts are assembled.

8. An assembling fixture having an inverted U-shaped frame on which the parts of an assembly may be positioned, a plurality of guide pins extending through holes in the upper portion of said frame, means for adjusting the height of said pins above the face of the fixture, a plurality of locating pins extending through holes in said upper portion over which the parts may be assembled, the height of said locating pins above the face of the fixture being limited by the height of said guide pins, and means for lowering said locating pins so that they do not project above the face of the fixture while said guide pins are maintained in their adjusted position.

9. In combination, an assembly fixture having a plurality of locating pins over which a plurality of parts may be assembled, a compressor in which said fixture may be positioned, a compressor plate having a plurality of holes therethrough, means for operating said compressor to cause said plate to tightly compress the parts together, the holes in said plate being in alignment with said locating pins, and means which is projected through the holes in said plate for lowering said locating pins into said fixture so that permanent retaining means may be applied to the pile-up of parts through the holes in said plate while the parts are under compression and after said means has been withdrawn.

10. In combination, an assembly fixture, a member movably mounted in said fixture and having locating pins which extend through the upper face of said fixture when the member is in raised position so that a plurality of parts may be assembled over said locating pins, a compressor in which said fixture may be positioned, a plate having a plurality of holes therethrough, aligning pins, means for lowering said aligning pins so that they pass through the holes in said plate and through said parts, forcing said member and locating pins downward and exactly positioning said parts one above the other, and means for operating said compressor to cause said plate to compress said parts together, said aligning pins being removable while compression is maintained so that permanent retaining means may be substituted therefor through the holes in said plate.

11. A compressor comprising a base piece having a recess therein in which a fixture holding the parts to be compressed is positioned, a compressor plate spanning the recess, means for operating said plate to compress the parts, a vertical standard mounted on said base piece, a lever pivoted at the upper end of said standard, and aligning pins controlled by said lever and adapted to be lowered through holes in said plate to properly position the parts on the fixture before they are compressed.

12. A compressor comprising a base piece having a recess therein in which a fixture holding the parts to be compressed is positioned, a vertical standard mounted on said base piece, a lever pivotally attached to the upper end of said standard, a rod or plunger operated by said lever, aligning pins secured to the end of said plunger and adapted to be lowered to properly position the parts on the fixture before they are compressed, a guide plate for said plunger loosely secured to said standard, said lever, plunger, and guide plate being arranged to be swung to the side when not in use so that they will not interfere with the operator of the compressor, and means for stopping said guide plate with said aligning pins in proper position above said recess.

13. The process of assembling a plurality of parts, which consists in providing a fixture having depressible locating pins and a compressor having aligning pins, in arranging the parts on the locating pins of the fixture, in inserting the fixture and parts into the compressor, in lowering the aligning pins to force out the locating pins and at the same time exactly position the parts, in compressing the parts, in removing the aligning pins, and in applying a permanent retaining means to the assembly of parts while the compression is maintained.

FREDERICK W. DOYLE.